United States Patent Office 3,195,976
Patented July 20, 1965

3,195,976
PURIFICATION OF HYDRAZINE BIS-BORANE
Frank C. Gunderloy, Jr., Menlo Park, N.J., assignor to Esso Research and Engineering Company, a corporation of Delaware
No Drawing. Filed Jan. 10, 1961, Ser. No. 81,895
3 Claims. (Cl. 23—14)

This invention is concerned with a method of purifying hydrazine bis-borane, $N_2H_4 \cdot 2BH_3$, to improve its thermal stability. This method uses dioxan (p-dioxan) to dissolve and remove traces of impurities responsible for instability. This method leads to recovery of the hydrazine bis-borane as a useful dioxan adduct product or as a final purified product of improved characteristics.

Hydrazine bis-borane (HBB) tends to be thermally unstable when it is contaminated by traces of impurities, as evidenced by evolution of hydrogen gas.

HBB is of interest as a high-energy monopropellant and source of driving fluid in a rocket motor.

Known methods for preparing HBB have yielded products of about 97% purity. One of such methods uses diethyl ether as solvent in reaction of hydrazine, $H_2NNH_2$, with $B_2H_6$. Others use a hydrocarbon diluent or a cyclic ether such as tetrahydrofuran in a reaction of hydrazine with diborane. The HBB products from these processes contain impurities that cause instability.

An improved method of forming HBB involves reaction of a hydrazine salt, e.g., $N_2H_4 \cdot H_2SO_4$ or $N_2H_4 \cdot 2HCl$, with alkali metal borohydride, $NaBH_4$, under anhydrous conditions in a cyclic ether solvent which dissolves the HBB product, and from which nearly 100% purity HBB is recovered.

Although certain synthesis variables (anhydrous reagents, excess $N_2H_4 \cdot H_2SO_4$ and proper solvent) can be controlled with special care to decrease contaminants significantly so as to lead to HBB of relatively high thermal stability, in accordance with the present invention a greater improvement can be made by removing impurities from the HBB product by a treatment with dioxan that permits recovery of the purified HBB as a dioxan adduct, from which crystalline HBB can be obtained.

The purification herein provided uses the dioxan as a selective liquid solvent for impurities which promote thermal degradation. This purification can be used on an HBB product in which the synthesis controls were used carefully or where there was a failure in the controls set forth.

The method of purification is illustrated by the following examples:

EXAMPLE I 1.19 gm. of ordinary HBB (prepared from $NABH_4 + N_2H_4 \cdot H_2SO_4$ in tetrahydrofuran under anhydrous conditions) was treated with 25 cc. of dioxan and stirred for 24 hours. The soluble portion was precipitated with pentane after filtering off the insoluble portion. After drying at 50° C. to remove dioxan of solvation, 0.72 gm. insoluble HBB and 0.47 gm. soluble HBB were recovered. These were then stored at 95° C., along with a sample of ordinary HBB. The results are shown in the table below.

Table 1.—*Extent of decomposition after after 164 hours @ 95° C.*

| Sample: | Percent decomposed |
|---|---|
| Ordinary HBB | 40–50 |
| Dioxan insoluble fraction | 5–10 |
| Dioxan soluble fraction | 100 |

The extent of decomposition was determined by infrared examination. These results clearly show that the impurities that promote degradation are removed by the dioxan, along with a portion of HBB that may be reprecipitated and later recycled with dioxan for further recovery. As further proof of stability, the dioxan-soluble fraction was tested in a gas measuring system. At 95° C., it gave off 12 ml. gas/gm. after 46 hours, compared to 40–50 ml. of gas/gm. for samples of ordinary HBB.

EXAMPLE II 1.14 gm. of $NaBH_4$ and 2.45 gm. of $N_2H_4 \cdot H_2SO_4$ were stirred together in 25 cc. of dioxan for 4 days. The mixture was then filtered and the cake washed with additional dioxan. Pentane was then added to the filtrate to precipitate part of the HBB, and the resultant precipitate separated by filtration was dried in vacuo to remove dioxan of solvation.

About 30% of the theoretical yield of HBB was recovered. In the 95° C. storage test, this material showed only 5–10% decomposition in 144 hours, compared to 40–50% decomposition for ordinary HBB. In this case, the impurities were left behind in the dioxan-rich precipitation liquors.

Of the two modifications described in Examples I and II, that of I is preferred since it allows for greater recovery of HBB, and may be applied to HBB prepared in any manner and it requires fewer operations. The exact proportion of dioxan used to wash the HBB is limited only by the solubility of the HBB. The time which the dioxan contacts the HBB is not critical. In general, amounts of dioxan from 1 to 75 cc. per gram of HBB and contact times of a few minutes to several days have proved effective. For practical reasons, e.g. high recovery of HBB and speed of operations, 20–30 cc. of dioxan per gram HBB and one-half to 2 hours contact time are preferred. The washing may be carried out with increments of dioxan in order to improve the efficiency of the process.

Striking changes occur when HBB is precipitated or crystallized in dioxan when preparing the HBB product and as a step in the purification treatment.

Relative stability tests show that preparation of HBB in dioxan gives a higher stability product than preparation in other solvents.

Table 2.—*Stability of HBB products*

| Sample: | Hours to 5 percent decomposition, 95° C. |
|---|---|
| Commercial (as received) | <12 |
| Commercial (further purified by vacuum drying) | 24 |
| Prepared in dioxan (as in Example II) | 144 |

The commercial product is believed to represent products formed by reaction of $N_2H_4$ and $B_2H_6$ in solvents such as diethyl ether, tetrahydrofuran, and benzene.

Moreover, the products prepared in dioxan or by other methods can be further purified and stabilized by treatment with dioxan as a selective solvent, washing agent or crystallization solvent.

Table 3.—*Storage stability tests of HBB samples*
[Effect of dioxan washing]

| Sample | 90° C. Storage Test—Standard cc. Gas Evolved Per g. Sample | |
|---|---|---|
| | After 40 Hrs. | After 100 Hrs. |
| Commercial | >200 | |
| Commercial, Recrystallized from Ethy Ether | 38 | 60 |
| Prepared from $NaBH_4 + N_2H_4 \cdot H_2SO_4$: | | |
| (a) In dry tetrahydrofuran | 81 | 119 |
| (b) In dry dioxan (totally precipitated) | 41 | 69 |
| Dioxan Washed | 9–15 | 15–22 |

When HBB is recovered from solution in dioxan by crystallization or precipitation, or is intimately contacted with liquid dioxan, it forms a stable solid solvate or complex with the dioxan, approaching a 1:1 molar ratio composition. This solvate dried at room temperature in vacuum loses the dioxan in 48 hours. The removal of the dioxan can be made faster at higher temperatures in the range of 20° C. to 90° C.

The HBB dioxan solvate represented by $$N_2H_4 \cdot 2BH_3 \cdot C_4H_8O_2$$

has a low solubility in dioxan compared to solubility of HBB in tetrahydrofuran and this low solubility under ordinary conditions of the dioxan solvate helps to separate the HBB from impurities soluble in the dioxan. Furthermore, the isolation of the purified HBB as a dioxanate, or stable dioxan solvate is found to form relatively large crystals. In contrast, microscopic examination shows that HBB prepared and treated by other solvents have no regular crystal structures or is in the form of an amorphous powder. The powder may be in a compact shape but this disintegrates easily. The HBB isolated as a dioxanate has a crystalline form.

In a preparation of HBB dioxanate, approximately 1 gram of purified $N_2H_4(BH_3)_2$ was stirred with 25 cc. of dioxan overnight at room temperature. 1.22 grams of solid crystalline HBB dioxanate $(N_2H_4(BH_3)_2 \cdot C_4H_8O_2)$ was recovered upon filtration and drying in the funnel. The dried crystals exhibited an infrared (I.R.) spectrum different from that of either HBB or dioxan. Upon heating to 50° C. in vacuo (e.g. down to <0.1 mm. Hg abs.) the material lost 0.72 gm. of dioxan (59.1%) to leave behind pure HBB crystals (I.R. identification). Theory for the 1:1 adduct is 59.6% dioxan. A small amount of HBB was left in dioxan which had been used in excess of theory. The dioxan solution (filtrate) yielded, upon evaporation or stripping of dioxan more of the HBB, accounting for the rest of the HBB originally used.

The HBB dioxanate or adduct can be used as a reducing agent or as a source for diborane. It is useful as a reducing agent on compounds such as carbonyl compounds, e.g. acetone.

Since HBB dioxanate is less sensitive to impact than HBB and has a higher auto-ignition temperature, it affords safer handling, storing, and processing of HBB propellant compositions. The dioxan may be stripped from the material after storage or at an appropriate point during processing.

The HBB dioxanate may be used as an additive in small amounts (e.g. 0.1 to about 1%) in hydrocarbon compositions, e.g. diesel fuels, and various commercial non-polar organic materials, liquid or solid as an antioxidant or stabilizing agent.

Large crystals of stable HBB are desirable for fundamental studies and operational steps. They are more easily separated from liquids. They allow latitude in compounding into propellant grains, especially if gradations in crystal size are important.

The following table compares the pure HBB material with its dioxan adduct:

*Table 4*

|  | Pure $N_2H_4(BH_3)_2$ | Dioxan Adduct $N_2H_4(BH_3)_2 \cdot C_4H_8O_2$ |
| --- | --- | --- |
| Impact Sensitivity (Kg.-inches) | 22 | >70 |
| Auto-ignition Temperature (5 sec.) ° C | 155-170 | 190-210 |

Various additional modifications and utilizations of the invention are intended to come within the scope and spirit of the invention claimed.

What is claimed is:

1. Method of purifying hydrazine bis-borane contaminated by a small amount of impurity which promotes thermal degradation of the hydrazine bis-borane, which comprises mixing said contaminated hydrazine bis-borane with sufficient liquid dioxan to dissolve a small portion of the hydrazine bis-borane with said impurity while a portion of the hydrazine bis-borane forms a solid solvate suspended in the liquid dioxan, separating said solid solvate from resulting liquid dioxan solution, washing the separated solid solvate with liquid dioxan, separating liquid dioxan solution from the washed solid solvate, then removing dioxan of solvation from the washed solid solvate to recover purified hydrazine bis-borane.

2. In the process of claim 1, the steps of recovering more purified hydrazine bis-borane by precipitating hydrazine bis-borane-dioxan solvate as solid from the liquid dioxan solution, filtering off the precipitated solvate solid from the solution, washing the solvate solid with dioxan, then removing dioxan liquid with dioxan of solvation from the washed solid.

3. Hydrazine bis-borane dioxanate in crystalline form and having the formula $N_2H_4(BH_3)_2 \cdot C_4H_8O_2$.

References Cited by the Examiner

Steindler et al.: J. Am. Chem. Soc., vol. 75, Jan. 31, 1953, page 756.

MAURICE A. BRINDISI, *Primary Examiner.*

ROGER L. CAMPBELL, CARL D. QUARFORTH, *Examiners.*